United States Patent Office 2,894,989
Patented July 14, 1959

2,894,989

2-FLUOROTROPONES AND THEIR PREPARATION

Burt C. Pratt and Owen Wright Webster, Wilmington, Del., assignors to E. I. du Pont de Nemours and Company, Wilmington, Del., a corporation of Delaware No Drawing. Application July 9, 1957
Serial No. 670,661

5 Claims. (Cl. 260—586)

This invention relates to 2-fluorotropones and to a process for their preparation.

Tropolone, cycloheptatrien-1-ol-2-one, is the first member of a series of compounds containing a seven-membered carbocyclic ring. Several investigations have been reported in the literature on cycloheptatrien-1-ol-2-ones and the preparation of derivatives including selected 2-halotropones. Thus, Doering et al., J. Am. Chem. Soc., 74, 5683, 5688 (1952), show the preparation of 2-chlorotropone, 2-bromotropone and 2-iodotropone. However, 2-fluorotropone has not been reported.

Fluorine is recognized as quite different from chlorine, bromine or iodine, e.g., Simons in his book "Fluorine Chemistry," Academic Press, N.Y., 1950, on page 402 states that, "we are forceably brought to the realization that analogy between chlorine and fluorine in chemical compounds is extremely hazardous." Henne and Midgley, J. Am. Chem. Soc., 58, 882 (1936), state that, "organic compounds containing fluorine quite often fail to follow empirical generalizations derived from the behavior of similar organic combinations containing some other halogen in place of fluorine. Many such contradictions are particularly emphasized by a study of the stability and reactivity."

The novel 2-fluorotropones of the invention are prepared by the action of sulfur tetrafluoride on a tropolone. The tropolone, and consequently the 2-fluorotropones produced therefrom, may be ring substituted in up to three positions with groups non-reactive either to sulfur tetrafluoride or hydrogen fluoride. More specifically, the groups encompassed include halogen, lower (1–6 carbon atoms) alkoxyl, and hydrocarbon radicals of up to seven carbon atoms such as alkyl, phenyl and benzyl. Preferred members of the aforementioned group of radicals are halogen of atomic number 17–35, inclusive.

The 2-fluorotropones obtained by this reaction are quite different from the corresponding chloro-, bromo-, or iodotropones in their hydrolytic behavior. The latter compounds give benzoic acid whereas the 2-fluorotropones undergo hydrolysis with the production of a non-fluorinated tropolone.

Sulfur tetrafluoride used as the fluorinating agent in the reaction of this invention can be prepared by methods described, for example, by Brown and Robinson, J. Chem. Soc., 1955, 3147–51.

In accordance with the invention, tropolone or a nuclearly substituted tropolone is reacted with sulfur tetrafluoride under substantially anhydrous conditions and preferably in the absence of oxygen. The reaction vessel is preferably made of stainless steel, platinum or a similar material that is inert to hydrogen fluoride. Conveniently, the air in the reaction chamber may be removed by evacuation or replaced by an inert gas, such as nitrogen or a hydrocarbon, before the sulfur tetrafluoride is charged into the vessel.

In general, the tropolone is introduced into the vessel along with any added inert solvent prior to the introduction of the sulfur tetrafluoride. Suitable inert solvents are those in which the reactants are soluble. The preferred solvents include hydrocarbons and fluorinated hydrocarbons, e.g., benzene, hexane, cyclohexane, and perfluorocyclohexane.

In a continuous process the reaction can be brought about by introducing the reactants in a tube maintained under the desired reaction conditions.

The temperature of the reaction is not critical. Usually, the temperature selected is within the range of about 25–125° C. for the reaction to proceed in a reasonable time. The time in which the reactants are in contact may vary from a few minutes to a day or longer. The exact time of contact and temperature are interdependent variables.

Reaction pressures are not critical. Generally, the process is carried out under autogenous pressure. However, superatmospheric, atmospheric and subatmospheric pressures can be used if desired.

The mole ratio of sulfur tetrafluoride to the tropolone employed is preferably at least 1:1, since the desired reaction takes place in a molar ratio but is by no means limited to this ratio. Excess sulfur tetrafluoride can be present with ratios of sulfur tetrafluoride to the tropolone as high as 6:1 and higher being suitable. Ratios under 1:1 are generally less economical.

Isolation and purification of the 2-fluorotropones are accomplished by conventional procedures. The 2-fluorotropones are generaly crystalline solids and can be purified by crystallization or, in some cases, by sublimation.

The following examples further illustrate the preparation of new compounds of this invention.

EXAMPLE I

2-fluorotropone

In a 145 ml. "Hastelloy" lined pressure vessel was placed 20 g. (0.16 mole) of tropolone dissolved in 40 ml. of anhydrous benzene. The vessel was cooled in a "Dry-Ice"/acetone bath, evacuated, and 22 g. (0.20 mole) of sulfur tetrafluoride was added. The vessel was sealed and agitated for 8 hours at 50° C. The vessel was then cooled to room temperature and vented. The benzene was removed from the reaction product by distillation. The residue was extracted with hot cyclohexane. On cooling, white crystals formed. These crystals were sublimed at 80–90° C./0.1 mm., to give 5.75 g. of 2-fluorotropone, M.P. 70.5–71.5° C. More 2-fluorotropone (3.15 g. crude) was isolated from the mother liquor and solid residues. The combined yield of 2-fluorotropone was 45%. The nuclear magnetic resonance spectrum and infrared spectrum were consistent for 2-fluorotropone.

Anal.—Calc'd. for $C_7H_5OF$: C, 67.75; H, 4.04.
Found: C, 67.46, 67.72; H, 4.17, 4.34.

EXAMPLE II

3,5,7-tribromo-2-fluorotropone

A mixture of 1.2 g. (0.00325 mole) of 3,5,7-tribromotropolone (prepared by bromination of an aqueous solution of tropolone), 2 g. (0.0185 mole) of sulfur tetrafluoride, and 5 ml. of benzene was sealed in a platinum tube at −80° C. The tube was placed in a 200 ml. bomb and back pressured with 100 atm. of nitrogen. The bomb was agitated for 8 hours at 60° C., then cooled to −80° C. in "Dry-Ice"/acetone, and the sealed platinum tube removed. The platinum tube was opened, and the benzene allowed to evaporate. The residue was recrystallized twice from cyclohexane to give 0.68 g. (55% yield)

of 3,5,7-tribromo-2-fluorotropone, M.P. 134–142° C. The infrared spectrum was consistent for 3,5,7-tribromo-2-fluorotropone.

Anal.—Calc'd for $C_7H_2OBr_3F$: C, 23.22; H, 0.55. Found: C, 23.40; H, 0.90.

The unexpected hydrolytic behavior of 2-fluorotropone is shown by Example A while Example B demonstrates the hydrolysis of 2-chlorotropone.

EXAMPLE A

Hydrolysis of 2-fluorotropone

To a stirred solution of 1.0 g. of potassium hydroxide and 10 ml. of water at 25° C. was added 0.5 g. of 2-fluorotropone. The fluorotropone dissolved immediately to give a yellow solution. The solution was stirred one-half hour. The solution was made slightly acidic with aqueous hydrochloric acid warmed on a hot plate, and 0.5 g. of copper acetate in water was added. The copper chelate which formed was collected on a filter and recrystallized from chloroform to give 0.5 g. (80% yield) of copper tropolonate. The infrared spectrum of this sample was identical with that of copper tropolonate prepared from tropolone.

EXAMPLE B

Hydrolysis of 2-chlorotropone

The hydrolysis of 2-chlorotropone at 100° C. with 2N sodium hydroxide to give benzoic acid has been reported in the literature (W. von E. Doering et al., J. Am. Chem. Soc., 74, 5683 (1952)). However, the hydrolysis of 2-chlorotropone was repeated under conditions identical to those used for the hydrolysis of 2-fluorotropone. A 40% yield of benzoic acid and a 45% yield of salicylaldehyde was obtained. A small portion of the crude hydrolysis product was acidified and treated with ferric chloride test solution. There was no color change. Tropolone in trace amounts gives a green coloration in this test.

Examples I and II show the production of 2-fluorotropone and a 2-fluorotropone containing other nuclear substituents. The fluorotropones that can be prepared in accordance with the invention are 3,7-dichloro-2-fluorotropone, 2-fluoro-3-methoxytropone, 2-fluoro-3,5,7-trimethyltropone, 2-fluoro-3-isopropyltropone, 2-fluoro-4-isopropyltropone, 2-fluoro-5-isopropyltropone, 2-fluoro-3-benzyltropone, 2-fluoro-3-phenyltropone, 2-fluoro-5-phenyltropone, 2-fluoro-3-bromotropone, 2-fluoro-5-methoxytropone and 2-fluoro-3,5,7-trichlorotropone which are obtained by substituting for tropolone and tribromotropolone in Examples I and II the following tropolones: 3,7-dichlorotropolone, 3-methoxytropolone, 3,5,7-trimethyltropolone, α-thujaplicin, β-thujaplicin, γ-thujaplicin, 3-benzyltropolone, 3-phenyltropolone, 5-phenyltropolone, 3-bromotropolone, 5-methoxytropolone and 3,5,7-trichlrotropolone.

The novel 2-fluorotropones of this invention are generally crystalline solids. As shown by Examples A and B, these new compounds exhibit an unusual reaction under alkaline aqueous conditions. Advantages can be taken of this property to provide an effective ink for glass as a result of the etching property exhibited by the 2-fluorotropones. A suitable ink for glass contains an inert pigment such as carbon black in non-aqueous solvent with 5% of 2-fluorotropone.

Of great importance is the fact that 2-fluorotropones are effective antibacterial agents. In this respect, the compounds of the invention differ in kind from the chlorine analogs. For the organisms tested, at least four to over thirty times as much 2-chlorotropone was required to achieve the same inhibition of growth provided by 2-fluorotropone.

To determine the minimum concentration at which they would prevent bacterial growth, 2-fluorotropone and 2-chlorotropone were tested as appears in the following example:

EXAMPLE III

Ten milligrams of 2-fluorotropone and 2-chlorotropone were separately dissolved in small amounts of acetone and sodium bicarbonate. Each mixture was diluted to 10 ml. with sterile 2% tryptose broth. A series of six test tubes (1, 2, 3, etc.) each containing 2 ml. of sterile 2% tryptose broth was prepared. A total of 2 ml. of the solution containing the test compound was added to tube 1, the solutions thoroughly mixed, and 2 ml. from the latter tube transferred to tube 2. After mixing this procedure was repeated for the other tubes with 2 ml. from the final tube being discarded. The tubes contained the following concentrations of compound: Tube 1=500 μg./ml; tube 2=250 μg./ml.; tube 3=125 μg./ml.; tube 4=62.5 μg./ml.; tube 5=31.25 μg./ml.; and tube 6=15.6 μg./ml.

Cultures of the test organisms were grown in 2% tryptose broth for 18–24 hours at 37° C. and diluted 1:10 in sterile tryptose broth. Tubes 1–6 along with a control were inoculated with 0.1 ml. of the 1:10 culture dilutions and the tubes incubated at 37° C. for 18–25 hours and examined for presence or absence of growth. In the table are recorded the results for each of the compounds expressed in terms of concentration (in micrograms per ml.) at and above which no bacterial growth occurred.

TABLE I

[Minimum Inhibitory Concentration (μg./ml.)]

| Compound | Test organisms | | | |
| --- | --- | --- | --- | --- |
|  | Micrococcus pyogenes var. aureus, H Str. | Streptococcus faecalis, 10C1 | Escherichia coli, 6A | Pseudomonas aeruginosa temple str. |
| 2-fluorotropone | <15.6 | <15.6 | 125 | 125 |
| 2-chlorotropone | 500 | 500 | >500 | >500 |

The above example shows the effectiveness of 2-fluorotropone as an antibacterial agent. The compound can be added to soap in concentrations of about one percent or less to form an antibacterial soap.

The 2-fluorotropones are also useful in various insecticidal, herbicidal and fungicidal preparations. To best utilize the new compounds of this invention, they are suitably mixed with a carrier material or conditioning agent of the kind generally referred to as adjuvants or modifiers to provide formulations adapted for ready and efficient application. Thus the insecticidal, fungicidal and herbicidal compositions are in the form of solutions, dusts, water-dispersible powders, aqueous dispersions and emulsions. When aqueous formulations are used, they should be prepared immediately before application since prolonged contact of the 2-fluorotropones with water hydrolyzes the compounds. In general the 2-fluorotropone will be present in amounts of 0.5 to 95% by weight of the composition when used as a herbicide. As an insecticide, the active compound will generally be present in quantities within the range of 0.001 to 1% or more by weight. A similar concentration can be employed in fungicidal applications.

When used as a contact spray at a concentration within the range of 0.001–0.0025%, 2-fluorotropone had substantially a 100% kill when applied to bean aphids and to the two-spotted mite. Furthermore, it exhibits equivalent effectiveness against the housefly.

The fungicidal applications can be illustrated as follows: 2-fluorotropone was dissolved in acetone-water to form a 0.2% solution which was sprayed onto tomato foliage. After the deposit had dried, the foliage was inoculated with the early blight fungus. Lesion counts that were made three days after the inoculation showed the compounds prevented the fungus disease. Higher concentrations of 2-fluorotropone should be avoided in this case since the tomato plant would suffer from the herbicidal properties of the compound.

As herbicides the compounds can be applied in a number of ways. Generally they are formulated by mixture with a conventional carrier material or conditioning agent as described in Todd U.S. Patents 2,655,444 through 2,655,447. These include adjuvants, such as dusts, solvents, wetting, dispersing, and emulsifying agents, as set forth in U.S. Patent 2,426,417. Preferred herbicidal compositions are in the form of water-dispersible powders which can be prepared by admixing one or more of the active compounds with a surface-active agent and a finely divided solid carrier, such as talc, natural clay, diatomaceous earth and other powdered diluents. The surface-active agents are used in amounts sufficient to impart water dispersibility to the powder. Liquid herbicidal compositions can be prepared by intimately dispersing or dissolving a 2-fluorotropone in conventional organic liquid herbicidal carriers.

The compounds of the present invention are, of course, applied to the locus or area to be protected from undesirable plant growth in amounts sufficient to exert the desired herbicidal action. The dosage is dependent upon the particular 2-fluorotropone and the nature of formulation used, type of treatment, type of vegetation to be controlled, climatic conditions, and the like. In general, when applied as a foliar spray, a dosage of about 0.5–20 pounds of the active ingredient per acre is suitable. The compounds are particularly useful for treatment of the soil to kill the weeds within a short time after their germination.

When applied in the general procedure described above, the compounds control both broad-leaved and grassy annual and perennial weeds such as crab grass, Johnson grass, wild mustard, dandelion, lamb's quarters, rough pigweed and plantain. They also inhibit or retard the growth of grasses when applied at low rates, e.g., one pound per acre.

We claim:

1. A method of preparing 2-fluorotropones comprising reacting a tropolone with sulfur tetrafluoride.

2. A method for preparing 2-fluorotropones comprising contacting a tropolone with sulfur tetrafluoride at temperatures of from about 25° C. to 125° C.

3. The process of claim 2 wherein the mole ratio of sulfur tetrafluoride to the tropolone ranges from 1:1 to 6:1.

4. A compound of the group consisting of 2-fluorotropone and derivatives thereof having substituted in up to three positions on the ring a member of the group consisting of halogen, lower alkoxyl and hydrocarbon radicals of up to seven carbon atoms.

5. The compound of the following structural formula:

References Cited in the file of this patent

Cook et al: J. Chem. Soc. (London) 1954, p. 4041.